United States Patent
Choi et al.

(10) Patent No.: US 12,445,848 B2
(45) Date of Patent: Oct. 14, 2025

(54) METHOD AND DEVICE FOR APPLYING USER PLANE SECURITY POLICY FOR PDU SESSION IN WIRELESS COMMUNICATION SYSTEM

(71) Applicant: SAMSUNG ELECTRONICS CO., LTD., Suwon-si (KR)

(72) Inventors: Hongjin Choi, Suwon-si (KR); Duckey Lee, Suwon-si (KR); Jungje Son, Suwon-si (KR); Taehyung Lim, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 17/817,630

(22) Filed: Aug. 4, 2022

(65) Prior Publication Data

US 2023/0053937 A1    Feb. 23, 2023

(30) Foreign Application Priority Data

Aug. 4, 2021 (KR) .......... 10-2021-0102804

(51) Int. Cl.
*H04W 12/086* (2021.01)
*H04W 12/69* (2021.01)
*H04W 28/02* (2009.01)

(52) U.S. Cl.
CPC ......... *H04W 12/086* (2021.01); *H04W 12/69* (2021.01); *H04W 28/0268* (2013.01)

(58) Field of Classification Search
CPC .............. H04W 12/086; H04W 12/69; H04W 28/0268

(Continued)

(56) References Cited

U.S. PATENT DOCUMENTS

2015/0143463 A1    5/2015  Baghel et al.
2019/0215629 A1*   7/2019  Kulavik ............... H04S 3/004
(Continued)

FOREIGN PATENT DOCUMENTS

CN    104219655 A  * 12/2014  .......... H04L 63/205
CN    106899562 A  *  6/2017
(Continued)

OTHER PUBLICATIONS

El-Atawy et al., "End-to-end verification of QoS policies," 2012 IEEE Network Operations and Management Symposium, Maui, HI, USA, 2012, pp. 426-434, doi: 10.1109/NOMS.2012.6211927. (Year: 2012).*

(Continued)

*Primary Examiner* — Peter C Shaw

(57) ABSTRACT

A method and device for applying a different security policy, per service traffic, to a protocol data unit (PDU) session in a wireless communication system. The method comprises receiving, by a session management function (SMF) managing a session for a user equipment (UE), first configuration information about a first user plane security policy of the UE from a unified data management (UDM) managing subscription information about the UE, receiving, by the SMF, second configuration information about a second user plane security policy to be applied to a specific service data flow from a policy and control function (PCF) managing a policy and charging control (PCC) rule, and determining a user plane security policy to be applied to the UE based on one selected from the first user plane security policy and the second user plane security policy according to priority.

16 Claims, 10 Drawing Sheets

(58) Field of Classification Search
USPC .......................................................... 726/1
See application file for complete search history.

(56) References Cited

U.S. PATENT DOCUMENTS

| | | | |
|---|---|---|---|
| 2020/0037165 A1* | 1/2020 | Kunz | .................. H04W 12/106 |
| 2020/0228975 A1 | 7/2020 | Li et al. | |
| 2020/0267786 A1 | 8/2020 | Qiao et al. | |
| 2021/0168151 A1 | 6/2021 | Sun et al. | |

FOREIGN PATENT DOCUMENTS

| | | | | | |
|---|---|---|---|---|---|
| CN | 109600339 A | * | 4/2019 | ........... | H04L 67/141 |
| CN | 109698817 A | * | 4/2019 | ............ | H04L 63/16 |
| WO | WO-2018201630 A1 | * | 11/2018 | ............ | H04W 92/10 |
| WO | WO-2019184832 A1 | * | 10/2019 | ........... | H04L 9/0861 |
| WO | WO-2019213856 A1 | * | 11/2019 | ........... | H04W 12/10 |
| WO | WO-2020038375 A1 | * | 2/2020 | | |
| WO | 2020/153894 A1 | | 7/2020 | | |

OTHER PUBLICATIONS

Vasileios et al., "Interoperability of security and quality of Service Policies Over Tactical SOA," 2016 IEEE Symposium Series on Computational Intelligence (SSCI), Athens, Greece, 2016, pp. 1-7, doi: 10.1109/SSCI.2016.7850077. (Year: 2016).*
Renesse et al., "QoS Conflict Resolution in Ad Hoc Networks," 2006 IEEE International Conference on Communications, Istanbul, Turkey, 2006, pp. 3826-3831, doi: 10.1109/ICC.2006.255668. (Year: 2006).*
Medvid et al., "Quality of service mechanisms and priority management in HSPA system," 2012 Proceedings of the 35th International Convention MIPRO, Opatija, Croatia, 2012, pp. 656-661. (Year: 2012).*
Marx, "A Service-Oriented Approach on Securing User Plane Traffic between NGN Security Domains," 2010 IEEE Wireless Communication and Networking Conference, Sydney, NSW, Australia, 2010, pp. 1-6, doi: 10.1109/WCNC.2010.5506123. (Year: 2010).*
Yan et al., "A Dynamic Service Identity-Based Security Policy Consistency Checking Mechanism in SDN," 2023 IEEE(CPSCom), Danzhou, China, 2023, pp. 59-64, doi: 10.1109/iThings-GreenCom-CPSCom-SmartData-Cybermatics60724.2023.00034. (Year: 2023).*
Zhang et al., "Overview of 5G security in 3GPP," 2017 IEEE Conference on Standards for Communications and Networking (CSCN), Helsinki, Finland, 2017, pp. 181-186, doi: 10.1109/CSCN.2017.8088619. (Year: 2017).*
Li et al., "Secure and Privacy-preserving Network Slicing in 3GPP 5G System Architecture," 2023 IEEE/CIC International Conference on Communications in China (ICCC), Dalian, China, 2023, pp. 1-6, doi: 10.1109/ICCC57788.2023.10233451. (Year: 2023).*
Huawei et al., "Threat analysis on NAS based redirection from 5GS to EPS", Change Request, 3GPP TSG-SA3 Meeting #103-e, May 17-28, 2021, S3-212377, 13 pages.
Huawei et al., "CR to include R-16 feature of UDM to 33.514", Change Request, 3GPP TSG-SA3 Meeting #103-e, May 17-28, 2021, S3-212381, 5 pages.
International Search Report dated Nov. 7, 2022 in connection with International Patent Application No. PCT/KR2022/011501, 4 pages.
Written Opinion of the International Searching Authority dated Nov. 7, 2022 in connection with International Patent Application No. PCT/KR2022/011501, 4 pages.
Supplementary European Search Report dated Oct. 30, 2024, in connection with European Patent Application No. 22853472.3, 10 pages.

* cited by examiner

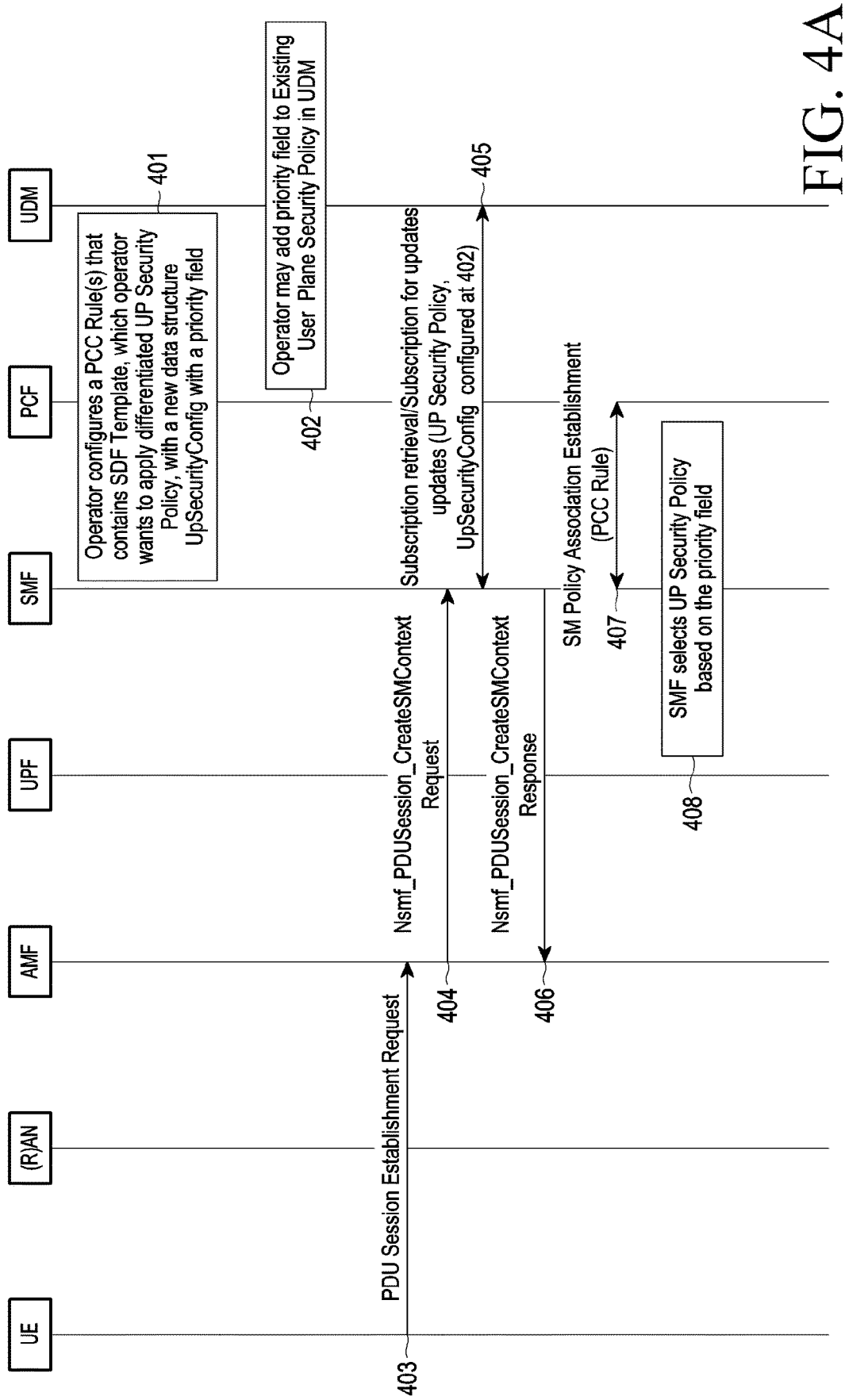

METHOD AND DEVICE FOR APPLYING USER PLANE SECURITY POLICY FOR PDU SESSION IN WIRELESS COMMUNICATION SYSTEM

CROSS-REFERENCE TO RELATED APPLICATION

This application is based on and claims priority under 35 U.S.C. 119 to Korean Patent Application No. 10-2021-0102804, filed on Aug. 4, 2021, in the Korean Intellectual Property Office, the disclosure of which is herein incorporated by reference in its entirety.

BACKGROUND

1. Field

The disclosure relates to a communication system, and more particularly, to a method and device for applying a security policy to a protocol data unit (PDU) session when establishing a PDU session to access a data network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The 5G system considers support for various services as compared with the legacy 4G system. For example, most representative services may include, e.g., enhanced mobile broadband (eMBB), ultra-reliable and low latency communication (URLLC), massive machine-type communication (mMTC), and evolved multimedia broadcast/multicast service (eMBMS). The system providing the URLLC service and the system providing the eMBB service, respectively, may be referred to as a URLLC system and an eMBB system. Further, the terms "service" and "system" may be interchangeably used.

Among them, the URLLC service is a service newly considered in the 5G system unlike in the legacy 4G system and, as compared with the other services, this service requires that ultra-high reliability (e.g., a packet error rate of about 10 to about −5) and low latency (e.g., about 0.5 msec) be met. To meet such strict requirements, the URLLC service may adopt a shorter transmission time interval (TTI) than that of the eMBB service and takes into consideration various operation methods utilizing the same.

Meanwhile, the 3GPP, which is in charge of cellular mobile communication standardization, has named the new core network structure 5G core (5GC) and standardized the same to promote the evolution from the legacy 4G LTE system to the 5G system.

5GC supports the following differentiated functions as compared to the evolved packet core (EPC), which is the legacy network core for 4G.

First, 5GC adopts the network slicing function. 5GC is required to support various types of user equipment (UE) and services. For example, such services may include enhanced mobile broadband (eMBB), ultra-reliable low latency communications (URLLC), and massive machine-type communications (mMTC). These UEs/services have different requirements for the core network. For example, the eMBB service requires a high data rate while the URLLC service requires high stability and low latency. Network slicing is technology proposed to meet such various requirements. In a wireless communication system supporting network slicing, traffic for different network slices may be processed by different protocol data unit (PDU) sessions. The PDU session may mean an association between a data network providing a PDU connection service and a UE.

Network slicing is a method for creating multiple logical networks by virtualizing one physical network, and the network slice instances (NSIs) may have different characteristics. Therefore, various service requirements may be met by allowing each NSI to have a network function (NF) suited for its characteristics. Various 5G services may be efficiently supported by allocating an NSI meeting required service characteristics for each UE. The instance may refer to a state in which a specific network function (NF) exists in the form of a software code and is executable by being assigned a physical or/and logical resource from a physical computing system (e.g., a specific computing system present on a core network) to perform the function of the NF.

Second, 5GC may seamlessly support the network virtualization paradigm by separating the mobility management function and the session management function. In legacy 4G LTE, all UEs may receive services over the network through signaling exchange with a single core device called the mobility management entity (MME) in charge of registration, authentication, mobility management and session management functions. However, in 5G, the number of UEs explosively increases and mobility and traffic/session characteristics that need to be supported according to the type of UE are subdivided. Resultantly, if all functions are supported by a single device, such as MME, the scalability of adding entities for each required function may decrease. Accordingly, various functions are under development based on a structure that separates the mobility management function and the session management function to enhance the scalability in terms of function/implementation complexity of the core equipment in charge of the control plane and the signaling load.

SUMMARY

The disclosure provides a method and device for applying a different security policy for each service traffic to a PDU session in a wireless communication system.

The disclosure also provides a method and device for applying/determining a different user plane security policy for each UE to a specific service data flow when establishing/creating a PDU session in a wireless communication system.

In 5GC, the session management function (SMF) and the user plane function (UPF) are entities responsible for some roles of the P-GW and S-GW of 4G, and the SMF performs session-related functions for the UE, and the UPF is responsible for the transfer of user data and is controlled by the SMF. The data management (UDM) is responsible for data storage and management.

The UE creates a PDU session through the SMF for data communication with the data network (DN). In the process of creating a PDU session, the SMF determines whether to activate the security for the entire traffic passing through the PDU session by the user plane security policy pre-configured by the SMF or the user plane security policy received from the UDM. As used herein, security means ciphering and integrity protection.

Because the user plane security policy is applied to the entire PDU session, if the user plane security policy is set to "required", traffic that does not need to be secured may be secured. If traffic that need not be protected is protected and transmitted, speed slowdown may be caused. If the user plane security policy is set to "not needed," the traffic which should be protected may not be protected.

For example, DNS traffic, which is traffic to be protected, and video streaming traffic, which do not need to be protected, may exist in one PDU session. Conventionally, the same security policy should be applied to all these traffics. If security is applied to the above PDU session, significant speed down may occur in the video streaming traffic and, unless security is applied, the DNS traffic may be attacked and be put at risk.

Various embodiments may provide a method for applying a UP security policy per traffic by pre-configuring, in the PCF, a PCC rule including a service data flow to which the operator desires to apply another UP security policy, for the service data flow. Aspects of the disclosure are not limited to the foregoing, and other unmentioned objects would be apparent to one of ordinary skill in the art from the following description.

According to an embodiment, a method for determining a user plane security policy for a protocol data unit (PDU) session in a wireless communication system comprises receiving, by a session management function (SMF) managing a session for a user equipment (UE), first configuration information about a first user plane security policy of the UE from a unified data management (UDM) managing subscription information about the UE, receiving, by the SMF, second configuration information about a second user plane security policy to be applied to a specific service data flow from a policy and control function (PCF) managing a policy and charging control (PCC) rule, and determining a user plane security policy to be applied to the UE based on one selected from the first user plane security policy and the second user plane security policy according to priority.

According to an embodiment, a session management function (SMF) configured to manage a protocol data unit (PDU) session for a user equipment (UE) in a wireless communication system comprises a transceiver and a processor configured to receive, through the transceiver, first configuration information about a first user plane security policy of the UE from a unified data management (UDM) configured to manage subscription information about the UE, receive, through the transceiver, second configuration information about a second user plane security policy to be applied to a specific service data flow from a policy and control function (PCF) configured to manage a policy and charging control (PCC) rule, and determine a user plane security policy to be applied to the UE based on one selected from the first user plane security policy and the second user plane security policy according to priority.

According to an embodiment, a method for determining a user plane security policy for a protocol data unit (PDU) session of a user equipment (UE) in a wireless communication system comprises creating, by a policy and control function (PCF) managing a policy and charging control (PCC) rule, configuration information including information about a priority for a user plane security policy to be applied to a specific service data flow, and transmitting, by the PCF, the configuration information including the information about the priority to a session management function (SMF) managing the PDU session for the UE, wherein the user plane security policy to be applied to the PDU session of the UE is determined based on the priority.

According to an embodiment, a policy and control function (PCF) managing a policy and charging control (PCC) rule in a wireless communication system, comprises a transceiver, and a processor configured to create configuration information including information about a priority for a user plane security policy to be applied to a specific service data flow, and transmit, through the transceiver, the configuration information including the information about the priority to a session management function (SMF) managing the PDU session for the UE, wherein the user plane security policy to be applied to the PDU session of the UE is determined based on the priority.

According to an embodiment, a method of a base station in a wireless communication system comprises receiving a message including security indication information corresponding to the user plane security policy to be applied to the specific service data flow and quality of service flow identifier (QFI) from a session management function (SMF) managing a protocol data unit (PDU) session, and creating a data radio bearer (DRB) for the specific service data flow based on the security indication information and the QFI.

According to an embodiment, a base station in a wireless communication system comprises a transceiver, and a processor configured to receive a message including security indication information corresponding to the user plane security policy to be applied to the specific service data flow and quality of service flow identifier (QFI) from a session management function (SMF) managing a protocol data unit (PDU) session, and create a data radio bearer (DRB) for the specific service data flow based on the security indication information and the QFI.

According to an embodiment, a method by an operator desiring to apply a different security policy, per service traffic, in a PDU session in a communication system may comprise configuring a UpSecurityConfig which is a new data structure including a UP security policy and a unique SDF ID in a PLMN for referencing a service data flow in a policy and charging control (PCC) rule including a service data flow template where a different security policy is desired to be applied to a policy and charging function (PCF), configuring, with the SDF ID capable of referencing a corresponding service data flow, the UpSecurityConfig which is data newly configured in a policy and charging function (PCF) in a user data management (UDM) when applying a different security policy to a specific user for a specific service data flow, and adding a priority field in preparation for collision between UP security policies to apply a UP security policy with higher priority to the corresponding service data flow.

According to an embodiment, a method by a session management function (SMF) to apply a different security policy per traffic in a PDU session in a communication system may comprise comparing priorities among a UpSecurityConfig received from a PCF, a UpSecurityConfig received from a UDM, and a UP security policy received from the UDM to apply a UP security policy with higher priority, allocating a different QoS flow to a service data flow with a different UP security policy although the QoS characteristic is the same, and combining and sending a QoS flow identity (QFI) and a QoS profile with the UP security policy to a base station (RAN).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIGS. 4A and 4B illustrate views of an example procedure of applying a security policy per service traffic in a PDU session according to various embodiments;

DETAILED DESCRIPTION

Figure 1:
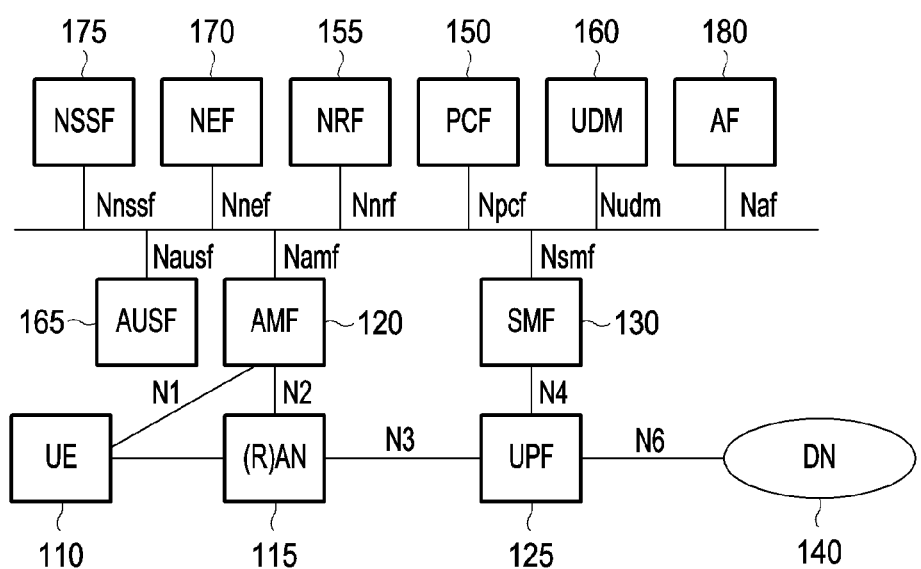
FIG. 1 illustrates a view of a 5G system network structure according to an embodiment.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments are described in detail with reference to the accompanying drawings. When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

For the same reasons, some elements may be exaggerated or schematically shown. The size of each element does not necessarily reflects the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card.

Hereinafter, the base station may be an entity allocating resource to terminal and may be at least one of eNodeB (eNB), Node B, base station (BS), radio access network (RAN), access network (AN), RAN node, NR NB, gNB, wireless access unit, base station controller, or node over network. The terminal may include UE (user equipment), MS (mobile station), cellular phone, smartphone, computer, or multimedia system capable of performing communication functions. In the disclosure, downlink (DL) refers to a wireless transmission path of signal transmitted from the base station to the terminal, and uplink (UL) refers to a wireless transmission path of signal transmitted from the terminal to the base station. Further, although LTE- or LTE-A-based system is described in connection with embodiments, as an example, embodiments may also apply to other communication systems with similar technical background or channel form. Further, embodiments may be modified in such a range as not to significantly depart from the scope of the disclosure under the determination by one of ordinary skill in the art and such modifications may be applicable to other communication systems.

In 5GC, the session management function (SMF) and the user plane function (UPF) are entities responsible for some roles of the packet data network (PDN)-gateway (P-GW) and serving-gateway (S-GW) of 4G, and the SMF performs session-related functions for the UE, and the UPF is responsible for the transfer of user data and is controlled by the SMF. The user data management (UDM) is responsible for data storage and management.

The UE creates/establishes a PDU session through the SMF for data communication with the data network (DN). In the process of creating/establishing a PDU session, the SMF determines whether to activate the security for the entire traffic passing through the PDU session by the user plane security policy pre-configured by the SMF or the user plane security policy received from the UDM. Here, security includes ciphering and integrity protection.

Since the user plane security policy is applied to the entire PDU session, if the user plane security policy is set to "required", traffic that does not need to be secured may be secured. If traffic that need not be protected is protected and transmitted, speed slowdown may be caused. If the user plane security policy is set to "not needed," the traffic which should be protected may not be protected.

For example, domain name system (DNS) traffic, which is traffic to be protected, and video streaming traffic, which do not need to be protected, may exist in one PDU session. Conventionally, the same security policy should be applied to all these traffics. If security is applied to the above PDU session, significant speed down may occur in the video streaming traffic and, unless security is applied, the DNS traffic may be attacked and be put at risk.

Various embodiments may provide a method for applying a user plane (UP) security policy per traffic by pre-configuring, in the PCF, a policy and charging control (PCC) rule including a service data flow to which the communication operator desires to apply another UP security policy, for the service data flow. Objects of the disclosure are not limited to the foregoing, and other unmentioned objects would be apparent to one of ordinary skill in the art from the following description.

In the disclosure, the (communication) operator may be understood to include at least one server device capable of communicating with network entities in embodiments of the disclosure.

A unit performing each function provided by the 5G network system may be defined as a network function (NF). An example of the structure of a 5G mobile communication network is shown in FIG. 1.

FIG. 1 illustrates a view of a network structure for a 5G system according to an embodiment.

The network structure of FIG. 1 may refer to the standards (e.g., TS 23.501, TS 23.502, TS 23.503, etc.) defined by the international telecommunication union (ITU) or 3GPP, and each of the components included in the network architecture of FIG. 1 may mean a physical entity or may mean software that performs an individual function or hardware combined with software. Reference characters denoted by Nx in FIG. 1, such as N1, N2, N3, . . . , etc., indicate known interfaces between network functions (NFs) in the 5G core network (NF), and the relevant descriptions may be found in the standard specifications (TS 23.501). Therefore, a detailed description will be omitted.

Referring to FIG. 1, the network structure may include at least one of an access and mobility management function (AMF) 120 for managing network access and mobility of a user equipment (UE) 110, a session management function (SMF) 130 for performing session-related functions for the UE 110, a user plane function (UPF) 125 that is in charge of transferring user data and being controlled by the SMF 130, an application function (AF) 180 that communicates with 5GC to provide application services, a network exposure function (NEF) 170 that supports communication with the AF 180, a unified data management (UDM) 160 and a unified data repository (UDR) (not shown) for data storage and management, a policy and control function (PCF) 150 for managing policies, or a data network (DN) 140 (e.g., Internet) where user data is transferred. The UDR may store the subscription information about the UE 110 and may provide the UDM 160 with the subscription information about the UE 110. Further, the UDR may store operator policy information and may provide operator policy information to the PCF 150.

In addition to the above-described NFs, there may be an operation, administration, and management (OAM) server (not shown) that is a system for managing the UE 110 and the 5G mobile communication network. The 5G network system may further include a RAN (e.g., a base station, such as gNB) 115, an authentication server function (AUSF) 165, a network slice selection function (NSSF) 175, and a network repository function (NRF) 155. For convenience of description, network entities operated according to embodiments are referred to below by the names of network functions (NFs) (e.g., AMF, UPF, SMF, PCF, UDM, etc.). However, the embodiments may be likewise applied even when the NF is actually implemented as an instance (e.g., an AMF instance, UPF instance, SMF instance, PCF instance, or UDM instance).

Figure 2A:
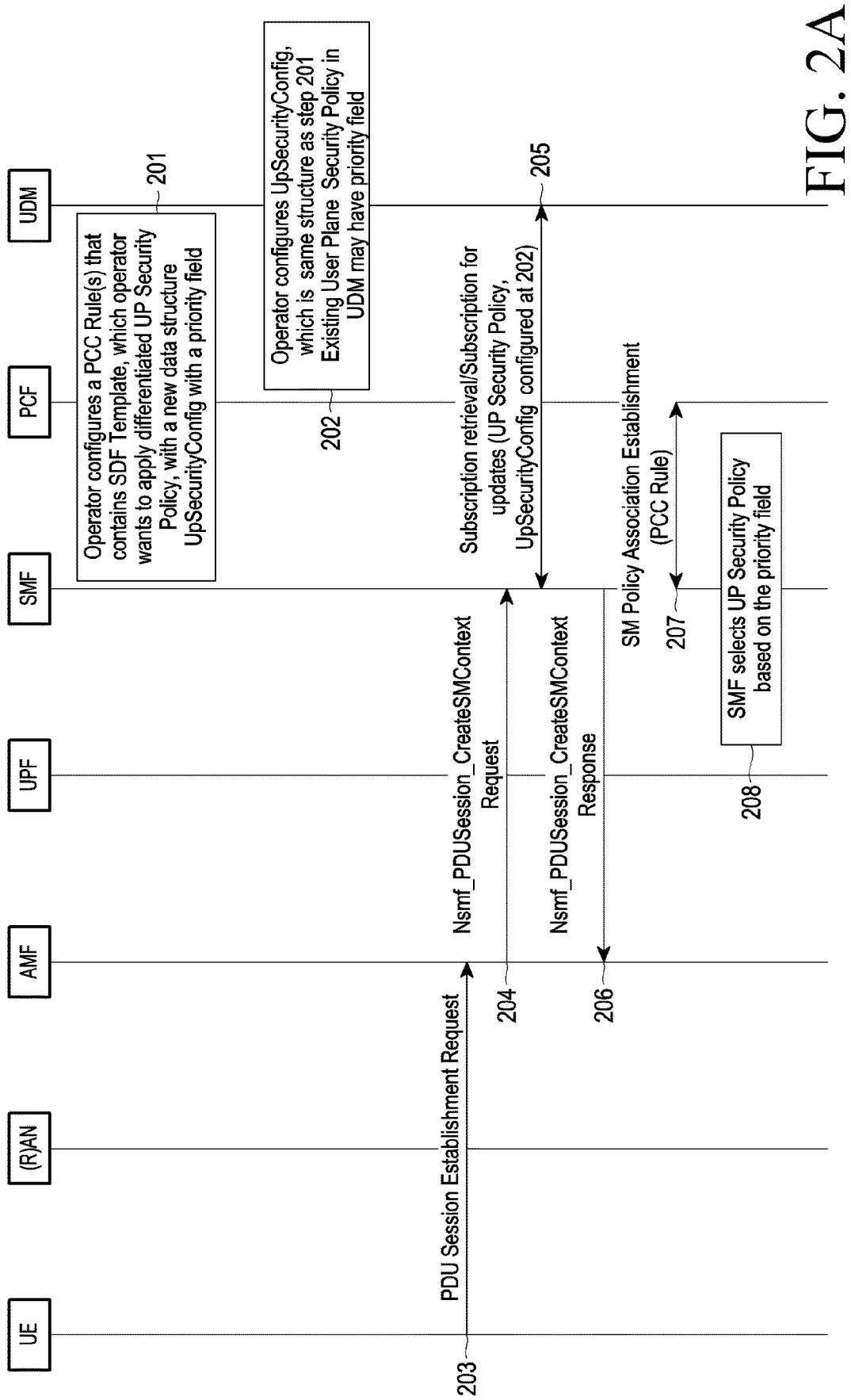
FIGS. 2A and 2B illustrate views of an example procedure of applying a security policy per service traffic in a PDU session according to various embodiments.
Figure 2B:
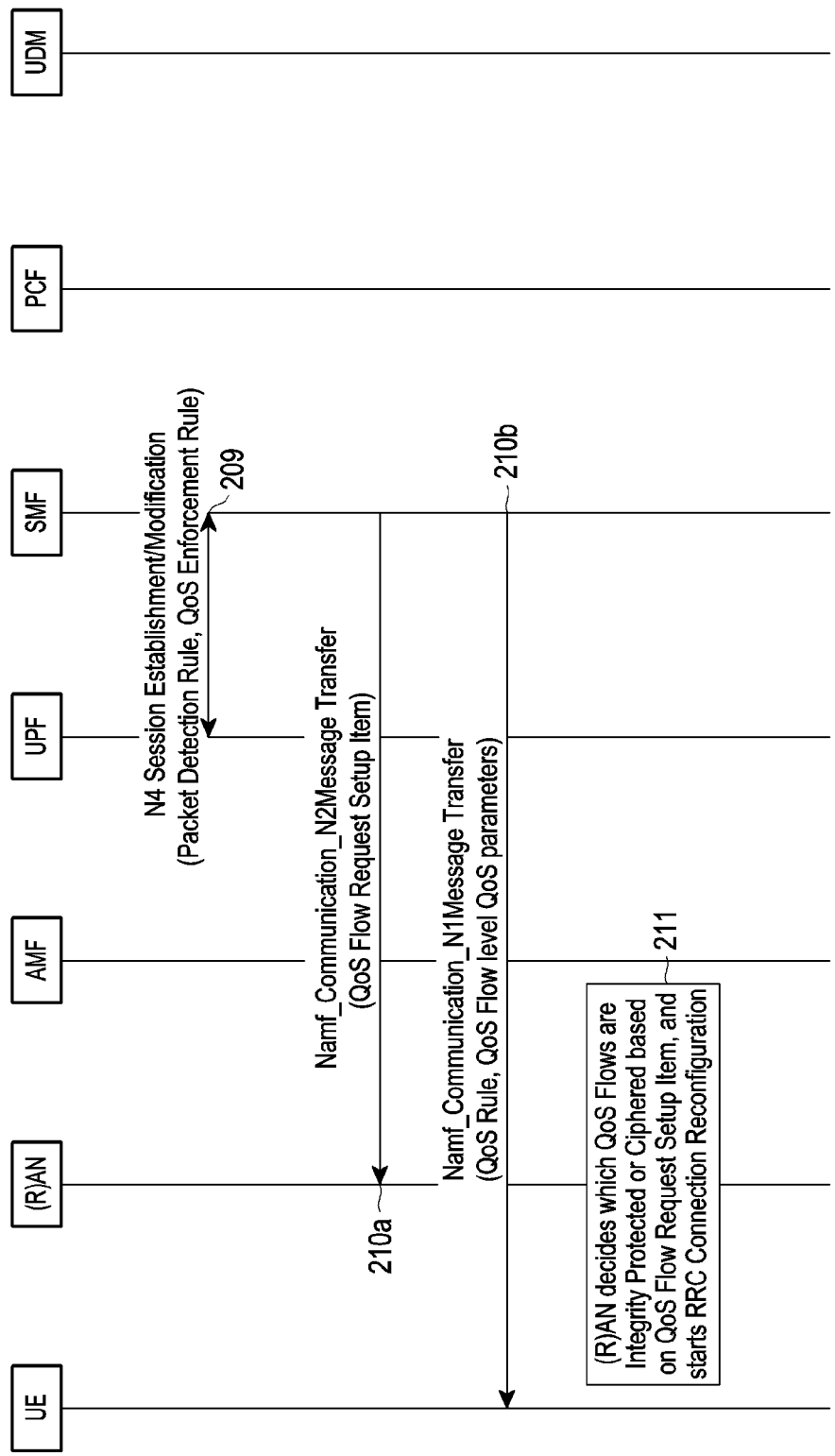

FIGS. 2A and 2B illustrate views of an example procedure of applying a security policy per service traffic in a PDU session according to various embodiments. Various embodiments may be implemented, including at least one of the steps described below.

For the procedure disclosed in FIGS. 2A and 2B, one or more of the following configurations may be performed in advance.

(A1) Pre-Configuration 1

A user plane security configuration (UP security configuration, UpSecurityConfig), which is a new data structure proposed in the disclosure, may be added to the PCC rule pre-configured in the PCF. The UpSecurityConfig may include at least one information of a service data flow identifier (SDF ID) that may refer to a corresponding service data flow in a public land mobile network (PLMN), and the user plane (UP) security policy applied to the corresponding service data flow. When applying a different user plane security policy for each user equipment (UE) to a specific service data flow, a data structure, such as UpSecurityConfig, set in the PCF may be pre-configured in the UDM. The UpSecurityConfig may be referred to as user plane security configuration information.

(A1) Pre-Configuration 2

In the embodiment of FIGS. 2A and 2B, the UP security policy stored in the existing UDM, the UpSecurityConfig pre-configured in the PCF, and the UpSecurityConfig pre-configured in the UDM may optionally include a priority field. For example, the lowest priority may be given to the UP security policy without a corresponding priority field.

Hereinafter, various embodiments of procedures for applying a security policy for each service traffic in a PDU session are described.

Referring to FIG. 2A, in operation 201, when the operator desires to apply a different user plane security policy to a specific service data flow, the operator may set a UpSecurityConfig, which is a new data structure, in the policy and charging control (PCC) rule including the corresponding service data flow. In the disclosure, the PCC rule may include a service data flow (SDF) template where a different security policy is to be applied to the PCF. To that end, the UpSecurityConfig includes a UP security policy to be applied to the corresponding service data flow and a service data flow identifier (SDF ID) in the PLMN where the service data flow of the corresponding PCC rule may be referenced. The UP security policy under the UpSecurityConfig may optionally include a priority field.

In an embodiment, if the operator does not desire to apply a different UP security policy for each service traffic to a specific UE, setting the UpSecurityConfig in the UDM in operation 202 may be omitted.

In operation 202, the operator may set the UpSecurityConfig, which is the same data structure as that set in operation 201, in the UDM to apply a different UP security policy for each UE. The existing UP security policy present in the UDM may optionally add a priority field.

In operation 203, the UE may transmit a PDU session establish request message to the AMF through the (R)AN.

In an embodiment, the PDU session establish request message may include a UE requested data network name (DNN).

The UE accesses the data network (e.g., a network providing an Internet service) through the 5G system and establishes a session and may identify each data network using an identifier called the DNN. The DNN may be used to determine, e.g., the NF related to the user plane, inter-NF interface, and user policy when the UE establishes a session with the network system. The DNN may be used to select the SMF and UPF for, e.g., the PDU session and be used to determine the operator's policy to apply to the PDU session.

In an embodiment, the PDU session establish request message may include the requested PDU session type. The requested PDU session type includes one of the following:
Initial PDU session
Existing PDU session
Emergency PDU session In operation 204, the AMF may send an Nsmf_PDUSession_CreateSMContext Request to create or update a session management context (SM context) with the SMF.

Among the NF services provided by the SMF for managing the session, service operations related to the PDU session are defined in the 5G standard (refer to TS 23.502 V16.xx) as shown in Table 1 below.

DUSession_CreateSMContext' request message, which is a PDU session create request message, from the AMF receiving the PDU session establish request message from the UE, as an association create operation between the AMF and the SMF to support the PDU session and, in response, transmit a 'Nsmf_PDUSession_CreateSMContext' response message to the AMF. The other service operations in Table 1 may refer to related standards, and a detailed description will be omitted.

In operation 205, the SMF may receive subscription information about the UE from the UDM using a corresponding data network name (DNN) and the UE's unique ID (subscription permanent identifier (SUPI)). The UE subscription information received by the SMF from the UDM may include the user plane security policy previously used for the UE and UpSecurityConfig newly set by the operator in operation 202.

In operation 206, the SMF may transmit an Nsmf_PDUSession_CreateSMContext Response, which is a PDU session creation response message for the service requested by the AMF in operation 204, to the AMF.

In operation 207, the SMF may transfer an SM policy association establishment request including data network information (data network name (DNN) or single-network slice selection assistance information (S-NSSAI)) to the PCF. In the 5G system, the network slice may be identified by the S-NSSAI. The S-NSSAI may include a slice/service type (SST) value and a slice differentiator (SD) value. The SST may indicate the characteristics of the service supported by the slice (e.g., enhanced mobile broadband (eMBB), massive IoT (MIOT), ultra-reliable low latency communications (URLLC), V2X, etc.). The SD may be a value used as an additional identifier for a specific service referred to as SST. In response to this, the PCF may transfer at least one of the service data flow template, the QoS profile, and the PCC rule including the above-described UpSecurityConfig to the SMF. Among the PCC rules that the PCF transfers to the SMF, there may be a PCC rule that does not include the UpSecurityConFIG.

In operation 208, the SMF compares the priority fields in the UpSecurityConfig's having the same SDF ID among the UpSecurityConfig's received from the UDM in operation

TABLE 1

| Service Name | Service Operations | Operation Semantics | Example Consumer(s) | |
|---|---|---|---|---|
| Nsmf_PDUSession | Create | Request/Response | V-SMF/I-SMF | |
| | Update | Request/Response | V-SMF/I-SMF, H-SMF | |
| | Release | Request/Response | V-SMF/I-SMF | |
| | CreateSMContext | Request/Response | AMF | |
| | UpdateSMContext | Request/Response | AMF | |
| | ReleaseSMContext | Request/Response | AMF | |
| | SMContextStatusNotify | Subscribe/Notify | AMF | |
| | StatusNotify | Subscribe/Notify | V-SMF/I-SMF | |
| | ContextRequest | Request/Response | AMF, I-SMF, SMF | |
| | ContextPush | Request/Response | SMF | |
| | SendMOData | Request/Response | AMF | |

The 5G system structure supports service-based interfaces, and the service-based interface related to SMF is defined as 'Nsmf' as exemplified in Table 1. In Table 1, 'Nsmf_PDUSession' means a service operating in a PDU session, and the service may include creation/deletion/modification operations for the PDU session, and these operations may be performed through transmission/reception of PDU session request/response messages between AMF and SMF. As in the example of Table 1, the SMF receives an 'Nsmf_P-

205 and the UpSecurityConfig's received from the PCF in operation 207 and apply the UpSecurityConfig with higher priority. The UpSecurityConfig lacking a priority field that may be optionally added may have a lower priority. The SMF may compare the priority field in the existing UP security policy in the UDM and the UpSecurityConfig finally determined by comparing the priorities between the UpSecurityConfig received from the UDM and the UpSecurityConfig received from the PCF and apply the UP security policy with higher priority. In this case, if one has no priority field that may optionally be added, it may be determined to have lower priority. For service data flow of PCC rule without UpSecurityConfig, the existing UP security policy in the UDM may be applied regardless of priority.

Referring to FIG. 2B, in operation 209, the SMF creates a QoS enforcement rule (QER) including information related to QoS enforcement of the traffic identified by the PDR(s) and the packet detection rule (PDR) to be used when the UPF classifies the packets (traffic (PDU)) using the UP security policy finally determined in operation 208 and the PCC rule received in operation 207 and transfer it to the UPF. When creating the QoS enforcement rule mapped to the packet detection rule, the SMF may not assign the same QoS flow identifier (QFI) to the service data flows to which different security policies (UP security policies) should be applied although they have the same QoS enforcement.

Information transferred by the SMF to the base station ((R)AN) through the AMF in operation 210a may include a QoS flow setup request item. In this case, the QoS flow setup request item may be transferred to the base station ((R)AN) through the Namf_Communication_N2MessageTransfer service, which is a message transfer service using the N2 interface, among the services provided by the AMF in the 3GPP standard. The QoS flow setup request item may include at least one of a QFI, QoS profile, which is QoS enforcement information that the packet having the corresponding QFI should receive, and security indication, which is UP security policy information. The security indication may include at least one of ciphering information and integrity protection information. The encryption information and the integrity protection information each may indicate one of "Required", "Preferred", and "Not Needed." Required indicates to the base station that ciphering/integrity protection is required, Preferred indicates that although the operator prefers ciphering/integrity protection, the base station may optionally perform ciphering/integrity protection, and Not Needed indicates that ciphering/integrity protection is not needed.

In operation 210b, the SMF may include at least one of the QoS rule and QoS flow level QoS parameter used for the UE to detect the packet and transmit it to the UE through the Namf_Communcation_N1Message Transfer which is a message transfer service using the N1 interface among the services provided by the AMF. In this case, the UE may receive at least one piece information used for packet detection through a non-access-stratum (NAS) message.

In operation 211, the (R)AN may know what UP security policy should be applied to the packet marked with what QFI from the QoS flow setup request item received from the SMF in operation 210a and, based thereupon, create a data radio bearer (DRB) through RRC connection reconfiguration. Upon indicating the ciphering indication and integrity protection indication included in the RRC connection reconfiguration, the security indication information in the QoS flow setup request item may be used. When mapping the QoS flow to the DRB, the base station ((R)AN) should consider not only the QoS profile information but also the security indication information. If the security indication information differs although the QoS profile is the same, they may not be mapped to the same DRB. If the QoS flow setup request item lacks the security indication, the base station ((R)AN) may apply existing UP security policy information received from the UDM to the packet having the corresponding QFI.

Figure 3A:
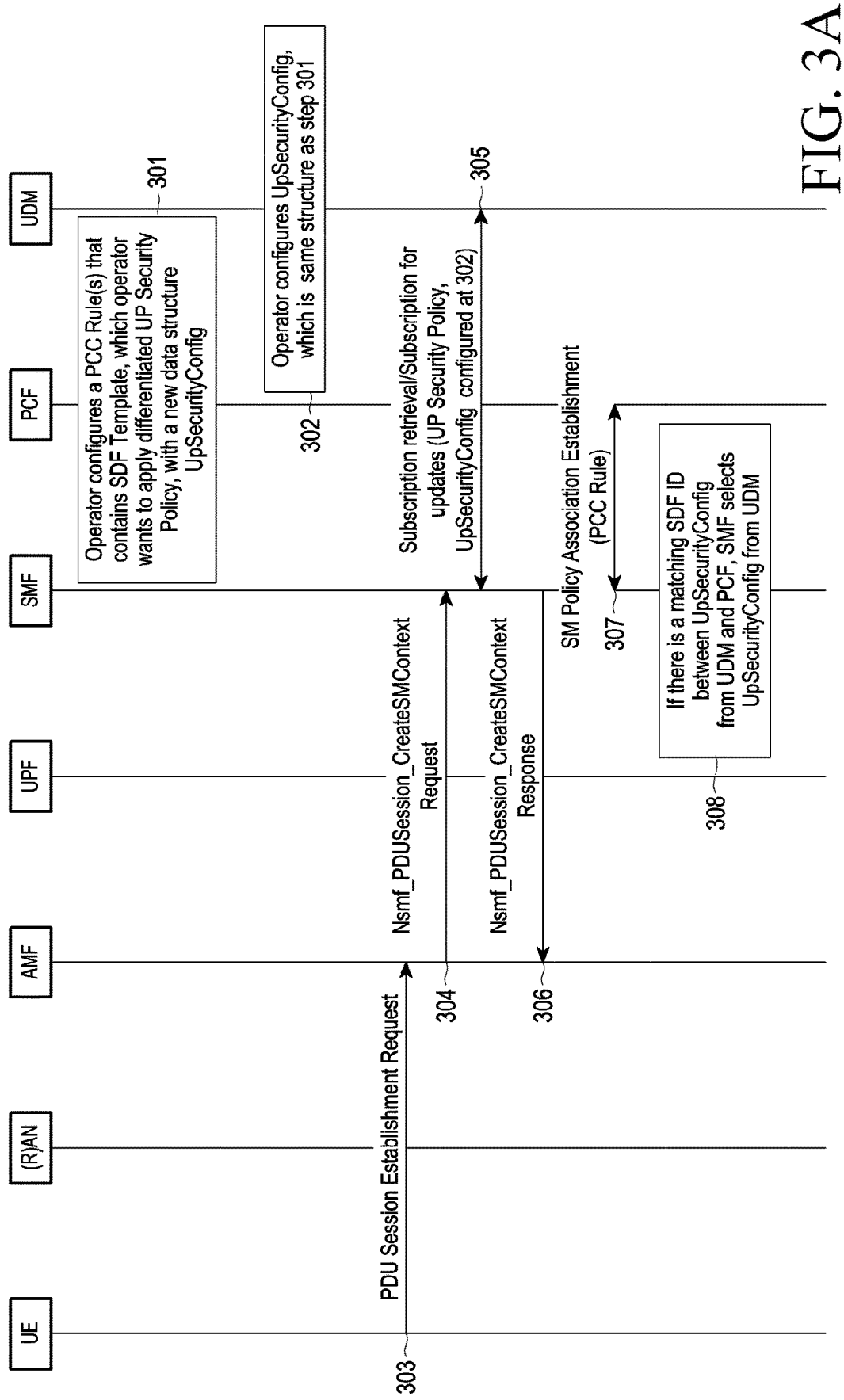
FIGS. 3A and 3B illustrate views of an example procedure of applying a security policy per service traffic in a PDU session according to various embodiments.
Figure 3B:
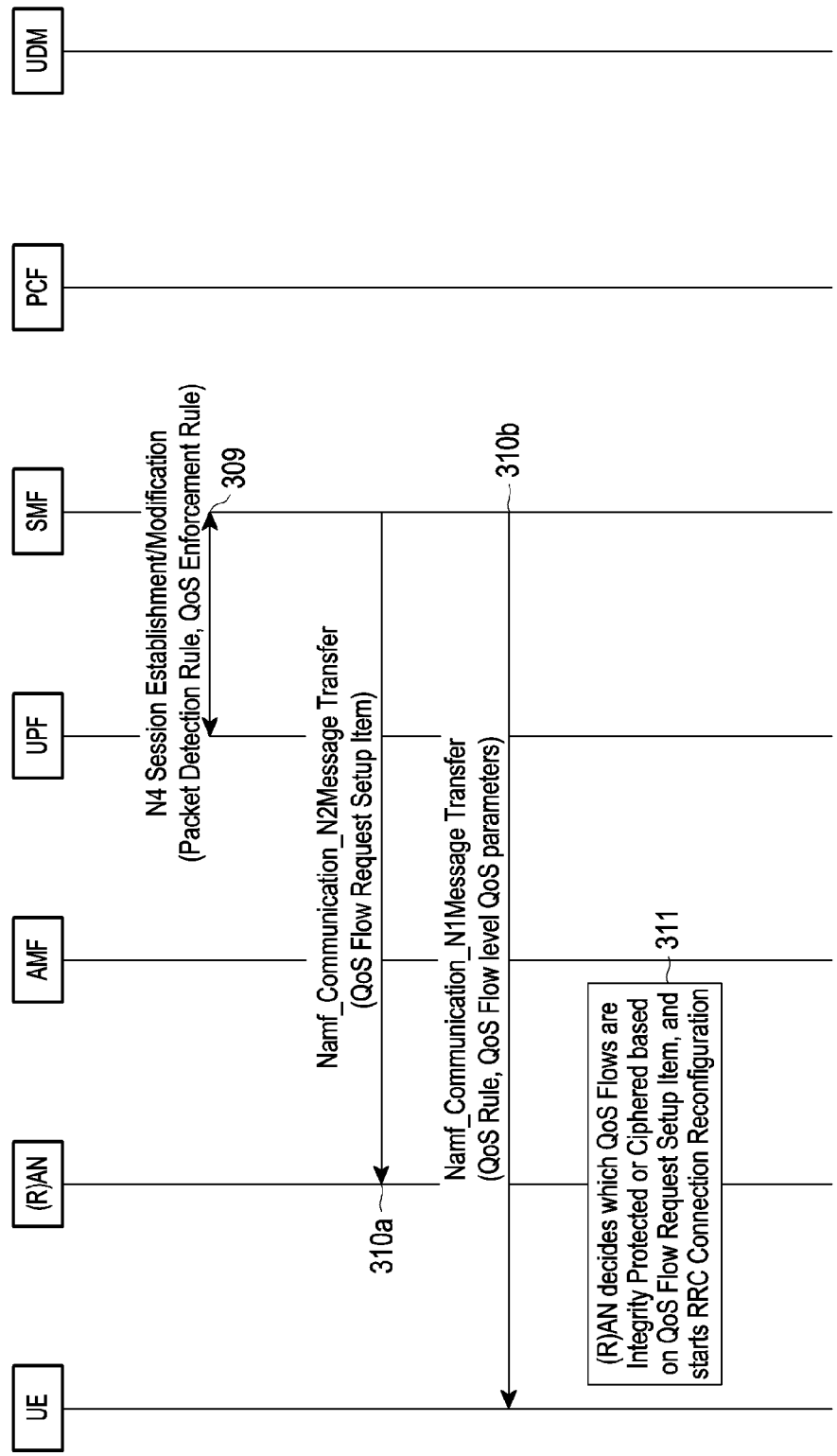

FIGS. 3A and 3B illustrate views of an example procedure of applying a security policy per service traffic in a PDU session according to various embodiments. Various embodiments may be implemented, including at least one of the steps described below.

For the procedure disclosed in FIGS. 3A and 3B, the following configurations may be performed in advance.

(A1) Pre-Configuration 1

A UP security configuration (UpSecurityConfig), which is a new data structure proposed in the disclosure, may be added to the PCC rule pre-configured in the PCF. The UpSecurityConfig may include at least one of a service data flow identifier (SDF ID) that may refer to a corresponding service data flow in a public land mobile network (PLMN), and the user plane (UP) security policy applied to the corresponding service data flow. When applying a different user plane security policy for each user equipment (UE) to a specific service data flow, a data structure, such as UpSecurityConfig, set in the PCF may be pre-configured in the UDM.

Compared with the embodiment of FIGS. 2A and 2B, the embodiment of FIGS. 3A and 3B exemplifies that a different user plane security policy is applied to each user equipment (UE) for a specific service data flow, but application of the UpSecurityConfig received from the UDM is prioritized.

Referring to FIG. 3A, in operation 301, when the operator desires to apply a different user plane security policy to a specific service data flow, the operator may set a UpSecurityConfig, which is a new data structure, in the policy and charging control (PCC) rule including the corresponding service data flow. In the disclosure, the PCC rule may include a service data flow (SDF) template where a different security policy is to be applied to the PCF. To that end, the UpSecurityConfig includes a UP security policy to be applied to the corresponding service data flow and a service data flow identifier (SDF ID) in the PLMN where the service data flow of the corresponding PCC rule may be referenced.

In an embodiment, if the operator does not desire to apply a different UP security policy for each service traffic to a specific UE, step 302 may be omitted.

In operation 302, the operator may set the UpSecurityConfig, which is the same data structure as that set in operation 301, in the UDM to apply a different UP security policy for each UE.

In operation 303, the UE may transmit a PDU session establish request message to the AMF through the (R)AN. In an embodiment, the PDU session establish request message may include a UE requested DNN. In an embodiment, the PDU session establish request message may include the requested PDU session type. The requested PDU session type includes one of the following:

Initial PDU session

Existing PDU session

Emergency PDU session

In operation 304, the AMF may send, to the SMF, an Nsmf_PDUSession_CreateSMContext Request, exemplified in Table 1, to create or update a session management context (SM context) with the SMF.

In operation 305, the SMF may receive subscription information about the UE from the UDM using a corresponding data network name (DNN) and the UE's unique ID (SUPI). The UE subscription information received by the SMF from the UDM may include the user plane security policy previously used for the UE and UpSecurityConfig newly set by the operator in operation 302.

In operation 306, the SMF may transmit an Nsmf_PDUSession_CreateSMContext Response, which is a PDU session creation response message for the service requested by the AMF in operation 304, to the AMF.

In operation 307, the SMF may transfer an SM policy association establishment request including data network information (data network name (DNN) or S-NSSAI) to the PCF. In response to this, the PCF may transfer at least one of the service data flow template, the QoS profile, and the PCC rule including at least one of the above-described UpSecurityConfig's to the SMF. Among the PCC rules that the PCF transfers to the SMF, there may be a PCC rule that does not include the UpSecurityConFIG.

In operation 308, if there are UpSecurityConfig's having the same SDF ID among the UpSecurityConfig's received from the UDM in operation 305 and the UpSecurityConfig's received from the PCF in operation 307, the SMF may prioritize application of the UpSecurityConfig received from the UDM. For service data flow of PCC rule without UpSecurityConfig, the existing UP security policy in the UDM may be applied regardless of priority.

Referring to FIG. 3B, in operation 309, the SMF may create and transfer, to the UPF, the packet detection rule (PDR) and the QoS enforcement rule (QER) to be used when the UPF classifies packets using the UP security policy finally determined in operation 308 and the PCC rule received from the PCF in operation 307. When creating the QoS enforcement rule (QER) mapped to the packet detection rule (PDR), the SMF may not assign the same QoS flow identifier (QFI) to the service data flows to which different security policies (UP security policies) should be applied although they have the same QoS enforcement.

Information transferred by the SMF to the base station ((R)AN) through the AMF in operation 310a may include a QoS flow setup request item. In this case, the QoS flow setup request item may be transferred to the base station ((R)AN) through the Namf_Communication_N2MessageTransfer service, which is a message transfer service using the N2 interface, among the services provided by the AMF in the 3GPP standard. The QoS flow setup request item may include at least one of a QFI, QoS profile, which is QoS enforcement information that the packet having the corresponding QFI should receive, and security indication, which is UP security policy information. The security indication may include at least one of ciphering information and integrity protection information. The encryption information and the integrity protection information each may indicate one of "Required", "Preferred", and "Not Needed."

In operation 310b, the SMF may include at least one of the QoS rule and QoS flow level QoS parameter used for the UE to detect the packet and transmit it to the UE through the Namf_Communcation_N1Message Transfer which is a message transfer service using the N1 interface among the services provided by the AMF. In this case, the UE may receive at least one piece information used for packet detection through a NAS message.

In operation 311, the (R)AN may know what UP security policy should be applied to the packet marked with what QFI from the QoS flow setup request item received from the SMF in operation 310a and, based thereupon, create a data radio bearer (DRB) through RRC connection reconfiguration. Upon indicating the ciphering indication and integrity protection indication included in the RRC connection reconfiguration, the security indication information in the QoS flow setup request item may be used. When mapping the QoS flow to the DRB, the base station ((R)AN) should consider not only the QoS profile information but also the security indication information. If the security indication information differs although the QoS profile is the same, they may not be mapped to the same DRB. If the QoS flow setup request item lacks the security indication, the base station ((R)AN) may apply existing UP security policy information received from the UDM to the packet having the corresponding QFI.

Figure 4B:
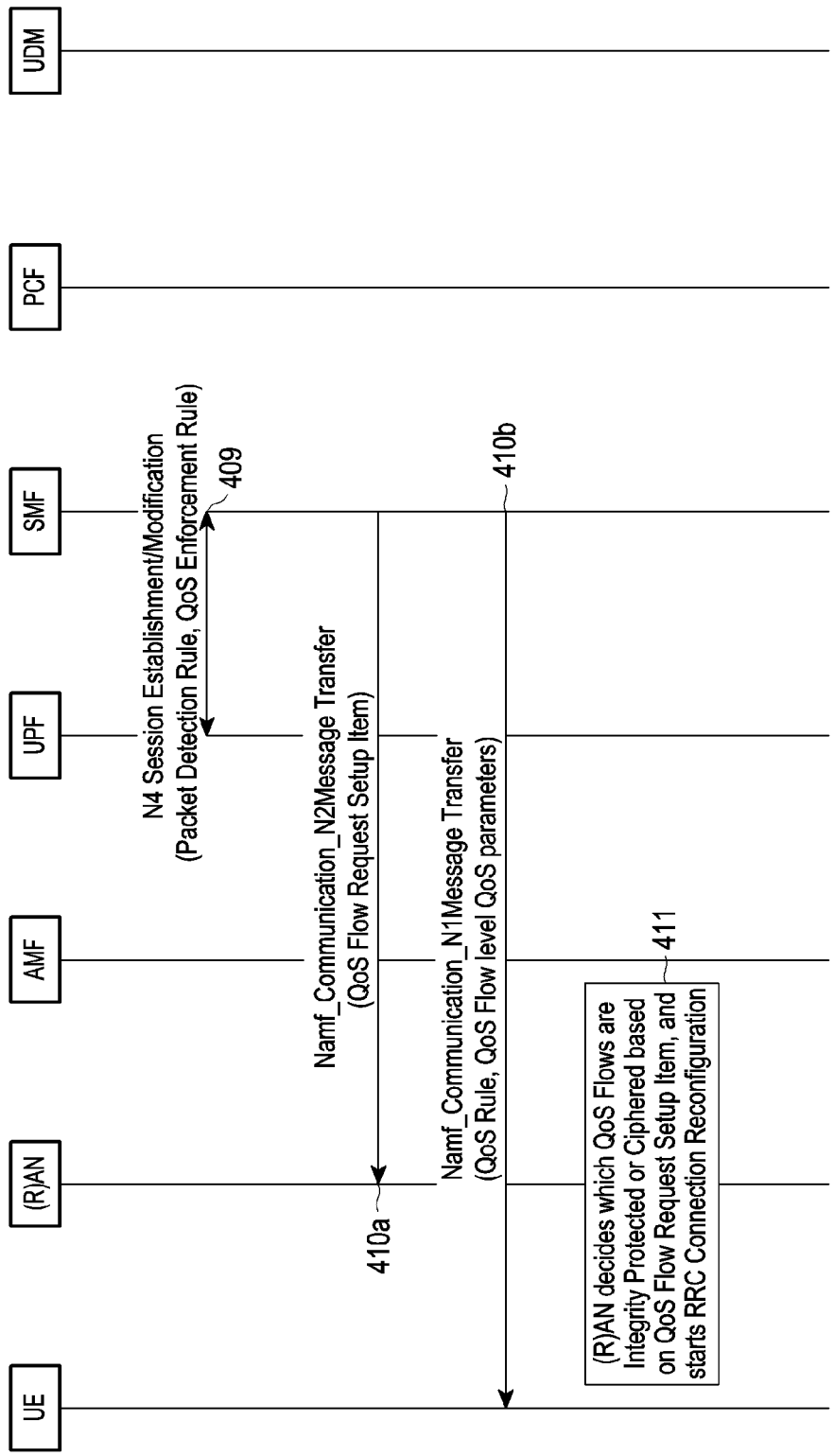

FIGS. 4A and 4B illustrate views of an example procedure of applying a security policy per service traffic in a PDU session according to various embodiments. Various embodiments may be implemented, including at least one of the steps described below.

For the procedure disclosed in FIGS. 4A and 4B, one or more of the following configurations may be performed in advance.

(A1) Pre-Configuration 1

A UP security configuration (UpSecurityConfig), which is a new data structure proposed in the disclosure, may be added to the PCC rule pre-configured in the PCF. The UpSecurityConfig may include the user plane security policy (UP security policy) to be applied to the corresponding service data flow, and the corresponding user plane security policy may have the same data structure as the existing user plane security policy present in the UDM.

(A1) Pre-Configuration 2

The existing UP security policy present in the UDM and the UpSecurityConfig pre-configured in the PCF may optionally include a priority field. The lowest priority may be given to the UP security policy without a corresponding priority field.

The embodiments of FIGS. 2A, 2B, 3A, and 3B represent examples in which a different user plane security policy is applied per user equipment (UE) for a specific service data flow. The embodiments of FIGS. 4A and 4B represent an example in which, for a specific service data flow, a user plane security policy different from another service data flow is applied, but the same user plane security policy is commonly applied between the user equipments (UEs) to which the specific service data flow is applied.

Referring to FIG. 4A, in operation 401, when the operator desires to apply a different user plane security policy to a specific service data flow, the operator may set a UpSecurityConfig, which is a new data structure, in the policy and charging control (PCC) rule including the corresponding service data flow. In the disclosure, the PCC rule may include a service data flow (SDF) template where a different security policy is to be applied to the PCF. To that end, the UpSecurityConfig may include UP security policy information to be applied to the corresponding service data flow. The UP security policy under the UpSecurityConfig may optionally include a priority field.

In operation 402, the existing UP security policy present in the UDM may optionally add a priority field.

In operation 403, the UE may transmit a PDU session establish request message to the AMF through the base station ((R)AN). In an embodiment, the PDU session establish request message may include a UE requested DNN. In an embodiment, the PDU session establish request message may include the requested PDU session type. The requested PDU session type includes one of the following:

Initial PDU session

Existing PDU session

Emergency PDU session

In operation 404, the AMF may send, to the SMF, an Nsmf_PDUSession_CreateSMContext Request, exemplified in Table 1, to create or update a session management context (SM context) with the SMF.

In operation 405, the SMF may receive subscription information about the UE from the UDM using a corresponding data network name (DNN) and the UE's unique ID (SUPI). The UE subscription information received by the SMF from the UDM may include a previously used user plane security policy (UP security policy).

In operation 406, the SMF may transmit an Nsmf_P-DUSession_CreateSMContext Response, which is a PDU session creation response message for the service requested by the AMF in operation 404, to the AMF.

In operation 407, the SMF may transfer an SM policy association establishment request including data network information (data network name (DNN) or S-NSSAI) to the PCF. In response to this, the PCF may transfer at least one of the service data flow template, the QoS profile, and the PCC rule including at least one of the above-described UpSecurityConfig's to the SMF. Among the PCC rules that the PCF transfers to the SMF, there may be a PCC rule that does not include the UpSecurityConFIG.

In operation 408, the SMF may compare priority fields among the UpSecurityConfig's received from the PCF in operation 407 and the UP security policies received from the UDM in operation 405 and apply the policy with higher priority. In this case, if one has no priority field that may optionally be added, it may be determined to have lower priority. For service data flow of PCC rule without UpSecurityConfig, the existing UP security policy in the UDM may be applied regardless of priority.

Referring to FIG. 4B, in operation 409, the SMF may create and transfer, to the UPF, the packet detection rule (PDR) and the QoS enforcement rule (QER) to be used when the UPF classifies packets using the UP security policy finally determined in operation 408 and the PCC rule received from the PCF in operation 407. When creating the QoS enforcement rule (QER) mapped to the packet detection rule (PDR), the SMF may not assign the same QoS flow identifier (QFI) to the service data flows to which different security policies (UP security policies) should be applied although they have the same QoS enforcement.

Information transferred by the SMF to the base station ((R)AN) through the AMF in operation 410a may include a QoS flow setup request item. In this case, the QoS flow setup request item may be transferred to the base station ((R)AN) through the Namf_Communication_N2MessageTransfer service, which is a message transfer service using the N2 interface, among the services provided by the AMF in the 3GPP standard. The QoS flow setup request item may include at least one of a QFI, QoS profile, which is QoS enforcement information that the packet having the corresponding QFI should receive, and security indication, which is UP security policy information. The security indication may include at least one of ciphering information and integrity protection information. The encryption information and the integrity protection information each may indicate one of "Required", "Preferred", and "Not Needed."

In operation 410b, the SMF may include at least one of the QoS rule and QoS flow level QoS parameter used for the UE to detect the packet and transmit it to the UE through the Namf_Communcation_N1MessageTransfer which is a message transfer service using the N1 interface among the services provided by the AMF. In this case, the UE may receive at least one piece information used for packet detection through a NAS message.

In operation 411, the (R)AN may know what UP security policy should be applied to the packet marked with what QFI from the QoS flow setup request item received from the SMF in operation 410a and, based thereupon, create a data radio bearer (DRB) through RRC connection reconfiguration. Upon indicating the ciphering indication and integrity protection indication included in the RRC connection reconfiguration, the security indication information in the QoS flow setup request item may be used. When mapping the QoS flow to the DRB, the base station ((R)AN) should consider not only the QoS profile information but also the security indication information. If the security indication information differs although the QoS profile is the same, they may not be mapped to the same DRB. If the QoS flow setup request item lacks the security indication, the base station ((R)AN) may apply existing UP security policy information received from the UDM to the packet having the corresponding QFI.

Figure 5A:
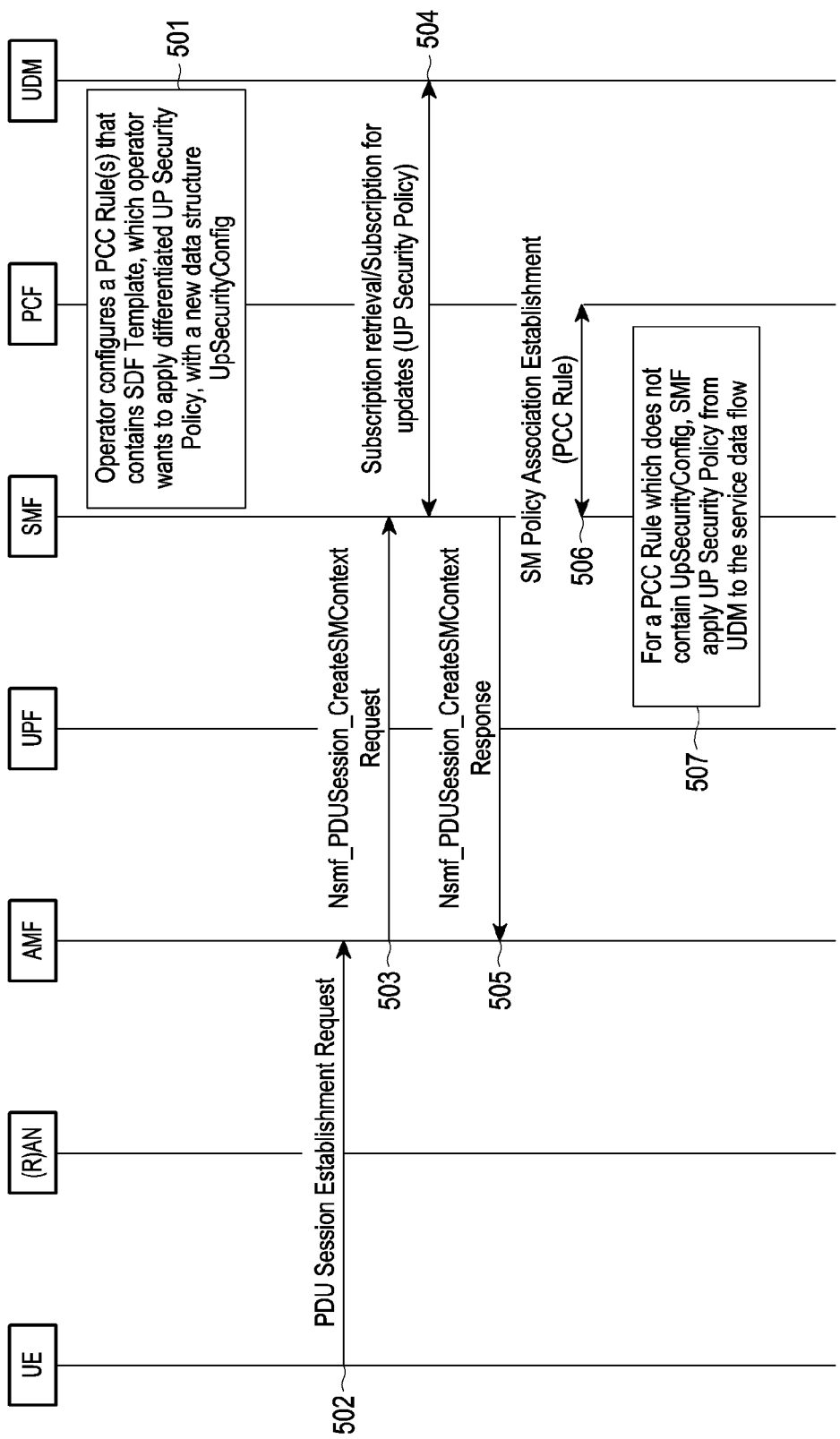
FIGS. 5A and 5B illustrate views of an example procedure of applying a security policy per service traffic in a PDU session according to various embodiments.
Figure 5B:
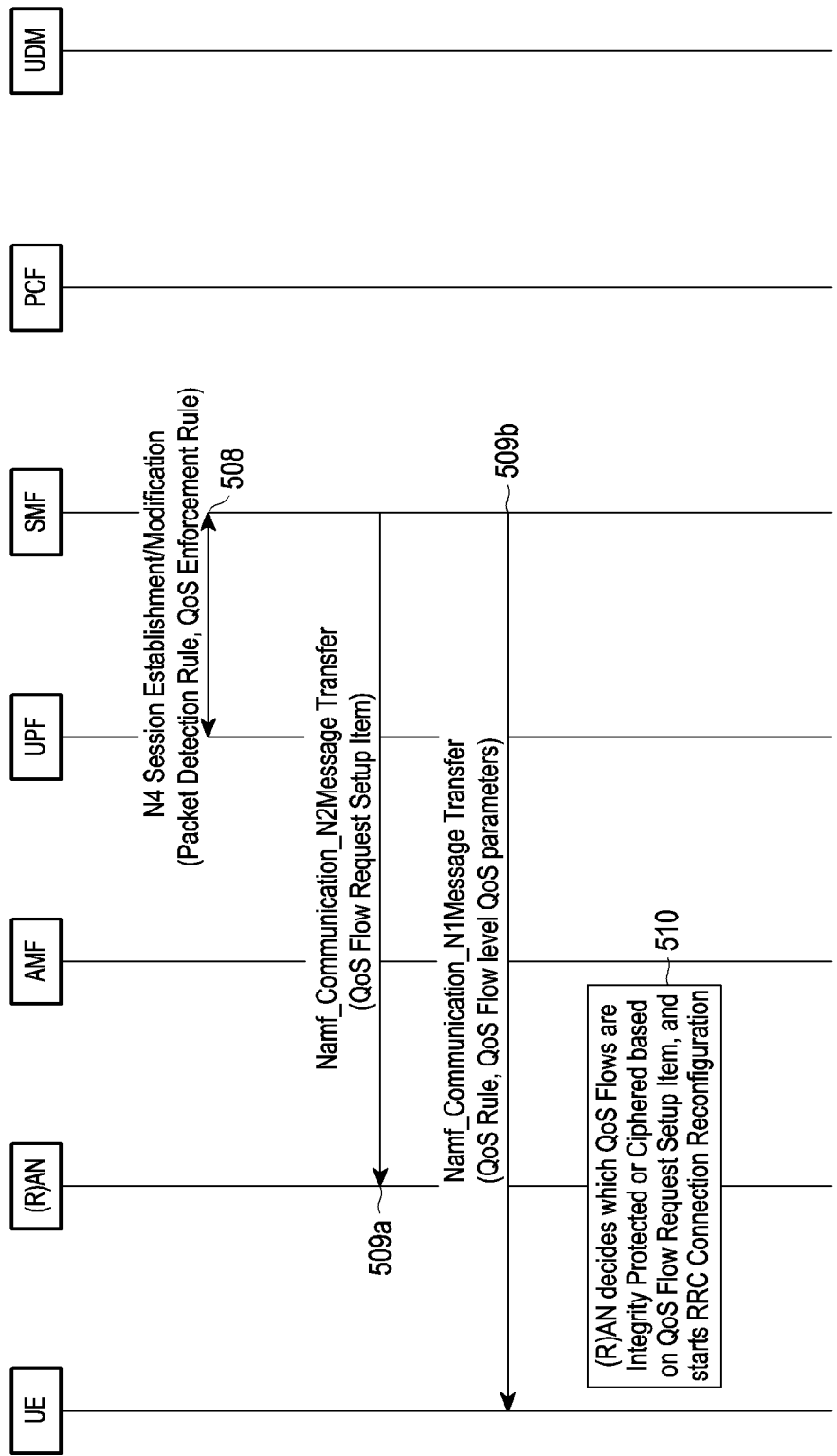

FIGS. 5A and 5B illustrate views of an example procedure of applying a security policy per service traffic in a PDU session according to various embodiments. Various embodiments may be implemented, including at least one of the steps described below.

For the procedure disclosed in FIGS. 5A and 5B, the following configurations may be performed in advance.

(A1) Pre-Configuration 1

A UP security configuration (UpSecurityConfig), which is a new data structure proposed in the disclosure, may be added to the PCC rule pre-configured in the PCF. The UpSecurityConfig may include the user plane security policy (UP security policy) to be applied to the corresponding service data flow, and the corresponding user plane security policy may have the same data structure as the existing user plane security policy present in the UDM.

The embodiments of FIGS. 2A, 2B, 3A, and 3B represent examples in which a different user plane security policy is applied per user equipment (UE) for a specific service data flow. The embodiments of FIGS. 5A and 5B represent an example in which, for a specific service data flow, a different user plane security policy is applied, but the user plane security policy is commonly applied between the user equipments (UEs) to which the specific service data flow is applied. Further, while the embodiment of FIGS. 4A and 4B exemplifies that a priority field is added to the user plane security policy (UP security policy) provided from the UDM, the embodiment of FIGS. 5A and 5B exemplifies that the user plane security policy (UP security policy) provided from the UDM lacks the priority field.

Referring to FIG. 5A, in operation 501, when the operator desires to apply a different user plane security policy to a specific service data flow, the operator may set a UpSecurityConfig, which is a new data structure, in the policy and charging control (PCC) rule including the corresponding service data flow. In the disclosure, the PCC rule may include a service data flow (SDF) template where a different security policy is to be applied to the PCF. To that end, the UpSecurityConfig may include UP security policy information to be applied to the corresponding service data flow.

In operation 502, the UE may transmit a PDU session establish request message to the AMF through the base station ((R)AN). In an embodiment, the PDU session establish request message may include a UE requested DNN. In an embodiment, the PDU session establish request message may include the requested PDU session type. The requested PDU session type includes one of the following:

Initial PDU session

Existing PDU session

Emergency PDU session

In operation 503, the AMF may send, to the SMF, an Nsmf_PDUSession_CreateSMContext Request, exemplified in Table 1, to create or update a session management context (SM context) with the SMF.

In operation 504, the SMF may receive subscription information about the UE from the UDM using a corresponding data network name (DNN) and the UE's unique ID (SUPI). The UE subscription information received by the SMF from the UDM may include a previously used user plane security policy (UP security policy).

In operation 505, the SMF may transmit an Nsmf_P-DUSession_CreateSMContext Response, which is a PDU session creation response message for the service requested by the AMF in operation 503, to the AMF.

In operation 506, the SMF may transfer an SM policy association establishment request including data network information (data network name (DNN) or S-NSSAI) to the PCF. In response to this, the PCF may transfer at least one of the service data flow template, the QoS profile, and the PCC rule including at least one of the above-described UpSecurityConfig's to the SMF. Among the PCC rules that the PCF transfers to the SMF, there may be a PCC rule that does not include the UpSecurityConFIG.

In operation 507, the SMF may apply the UP security policy present in the UpSecurityConfig of the PCC rule to the service data flow including the UpSecurityConfig in the PCC rule received from the PCF in operation 506 and apply the UP security policy received from the UDM in operation 504 to the service data flow of the PCC rule not including the UpSecurityConFIG.

Referring to FIG. 5B, in operation 508, the SMF may create and transfer, to the UPF, the packet detection rule (PDR) and the QoS enforcement rule (QER) to be used when the UPF classifies packets using the UP security policy finally determined in operation 507 and the PCC rule received from the PCF in operation 506. When creating the QoS enforcement rule (QER) mapped to the packet detection rule (PDR), the SMF may not assign the same QoS flow identifier (QFI) to the service data flows to which different security policies (UP security policies) should be applied although they have the same QoS enforcement.

Information transferred by the SMF to the base station ((R)AN) through the AMF in operation 509a may include a QoS flow setup request item. In this case, the QoS flow setup request item may be transferred to the base station ((R)AN) through the Namf_Communication_N2MessageTransfer service, which is a message transfer service using the N2 interface, among the services provided by the AMF in the 3GPP standard. The QoS flow setup request item may include at least one of a QFI, QoS profile, which is QoS enforcement information that the packet having the corresponding QFI should receive, and security indication, which is UP security policy information. The security indication may include at least one of ciphering information and integrity protection information. The encryption information and the integrity protection information each may indicate one of "Required", "Preferred", and "Not Needed."

In operation 509b, the SMF may include at least one of the QoS rule and QoS flow level QoS parameter used for the UE to detect the packet and transmit it to the UE through the Namf_Communcation_N1Message Transfer which is a message transfer service using the N1 interface among the services provided by the AMF. In this case, the UE may receive at least one piece information used for packet detection through a NAS message.

In operation 510, the (R)AN may know what UP security policy should be applied to the packet marked with what QFI from the QoS flow setup request item received from the SMF in operation 509a and, based thereupon, create a data radio bearer (DRB) through RRC connection reconfiguration. Upon indicating the ciphering indication and integrity protection indication included in the RRC connection reconfiguration, the security indication information in the QoS flow setup request item may be used. When mapping the QoS flow to the DRB, the base station ((R)AN) should consider not only the QoS profile information but also the security indication information. If the security indication information differs although the QoS profile is the same, they may not be mapped to the same DRB. If the QoS flow setup request item lacks the security indication, the base station ((R)AN) may apply existing UP security policy information received from the UDM to the packet having the corresponding QFI.

According to various embodiments, the UpSecurityConfig set in the PCF and the UpSecurityConfig set in the UDM by the operator, as well as the existing user plane security policy stored in the UDM when creating a PDU session may be transferred to the SMF. The SMF may determine a UP security policy based on the priority of user plane security policy and determine a security policy to be applied to the corresponding service data flow.

According to various embodiments, the SMF creates and sends a packet detection rule and a QoS enforcement rule which are used when the user plane function (UPF) classifies packets and, in this case, should prevent the packet, which has the same QoS profile but a different UP security policy, from having the same QoS flow identifier (QFI).

According to various embodiments described above, the SMF sends the QFI and the QoS profile of the packet having the QFI and whether the packet having the QFI has a UP security policy to the base station (RAN), and the RAN maps the packet having a specific QFI to a specific data radio bearer (DRB) with the information. In this case, QoS flows having different UP security policies, although having the same QoS profile, may not be mapped to the same DRB.

Effects obtainable from various embodiments are not limited to the foregoing, and other unmentioned effects would readily be appreciated by one of ordinary skill in the art from the following description.

Figure 6:
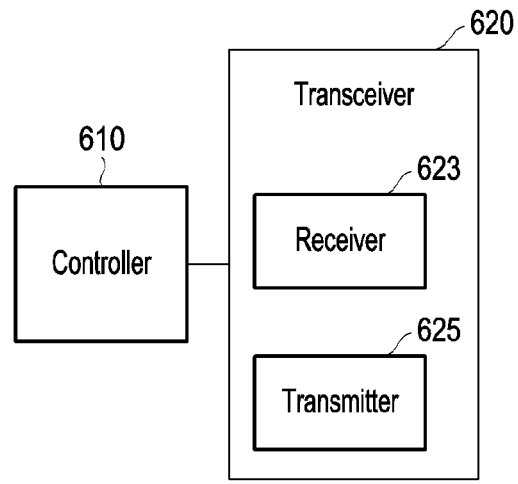
FIG. 6 illustrates a view of a configuration of a UE according to an embodiment.

FIG. 6 illustrates a view of a configuration of a UE according to an embodiment.

Referring to FIG. 6, a UE may include a transceiver 620 and a controller 610 for controlling the overall operation of the UE. The transceiver 620 may include a transmitter 625 and a receiver 623.

In FIG. 6, the transceiver 620 may transmit/receive signals/information/messages with other network entities (e.g., AMF or a base station). The transceiver 620 may be referred to as a transmission/reception unit.

In FIG. 6, the controller 610 may control the UE to perform an operation according to any one or a combination of two or more of the above-described embodiments of FIGS. 1 to 5. Meanwhile, the controller 610 and the transceiver 620 are not necessarily implemented in separate modules but rather as a single component, e.g., a single chip. The controller 610 and the transceiver 620 may be electrically connected with each other. In an embodiment, the controller 610 may be a circuit, an application-specific circuit, or at least one processor. The operations of the UE may be realized by including a memory device storing a corresponding program code in a component (e.g., the control unit 610 and/or other components not shown) in the UE.

Figure 7:
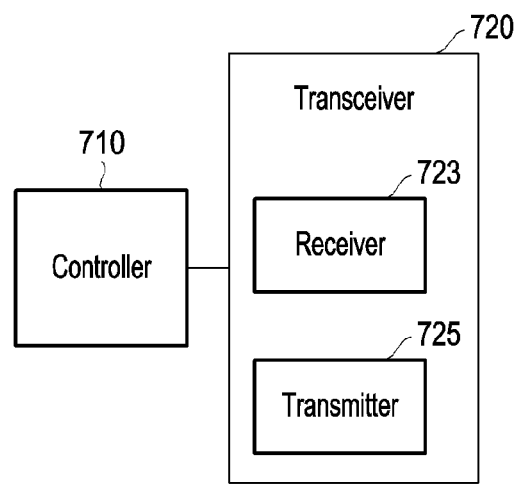
FIG. 7 illustrates a view of a configuration of a network entity according to an embodiment.

FIG. 7 illustrates a view of a configuration of a network entity according to an embodiment. The network entity shown in FIG. 7 may include at least one network function (e.g., at least one NF of a base station, AMF, SMF, UPF, PCF, and UDM) according to a system implementation.

Referring to FIG. 7, the network entity may include a transceiver 720 and a controller 710 for controlling the overall operation of the network entity. The transceiver 720 may include a transmitter 725 and a receiver 723. The transceiver 720 may be referred to as a transmission/reception unit.

The transceiver 720 may transmit/receive signals/information/messages with a UE or other network entities according to embodiments.

The controller 710 may control the network entity to perform an operation according to any one or a combination of two or more of the above-described embodiments of FIGS. 1 to 5. Meanwhile, the controller 710 and the transceiver 720 are not necessarily implemented in separate modules but rather as a single component, e.g., a single chip. The controller 710 and the transceiver 720 may be electrically connected with each other. In an embodiment, the controller 710 may be a circuit, an application-specific circuit, or at least one processor. The operations of the network entity may be realized by including a memory device storing a corresponding program code in a component (e.g., the control unit 710 and/or other components not shown) in the network entity.

It should be noted that the configuration views, example views of control/data signal transmission/reception methods, and example views of operational procedures of FIGS. 1 to 7 are not intended as limiting the scope of the disclosure. In other words, all the components, entities, or operational steps illustrated in FIGS. 1 to 7 should not be construed as essential components to practice the disclosure, and the disclosure may be rather implemented with only some of the components without departing from the gist of the disclosure.

The operations of the above-described embodiments may be implemented by providing a memory device storing a corresponding program code in any component of the device. In other words, the controller in the device may execute the above-described operations by reading and executing the program codes stored in the memory device by a processor or central processing unit (CPU).

As described herein, various components or modules in the entity, or UE may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments have been described above, various changes may be made thereto without departing from the scope of the disclosure. Thus, the scope of the disclosure should not be limited to the above-described embodiments, and should rather be defined by the following claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for determining a user plane security policy for a protocol data unit (PDU) session in a wireless communication system, the method comprising:

receiving, by a session management function (SMF) managing a session for a user equipment (UE), first configuration information about a first user plane security policy of the UE from a unified data management (UDM) managing subscription information about the UE;

receiving, by the SMF, second configuration information about a second user plane security policy to be applied to a specific service data flow from a policy and control function (PCF) managing a policy and charging control (PCC) rule;

selecting, by the SMF, one of the first configuration information or the second configuration information according to priority based on service data flow identifier (SDF ID) and priority field;

selecting, by the SMF, one of selected configuration information or security policy applied to the UE according to priority based on the priority field; and determining, by the SMF, a user plane security policy to be applied to the UE based on the selected configuration information or security policy applied to the UE according to priority.

2. The method of claim 1, wherein a different user plane security policy is applied, per UE, to the specific service data flow, and wherein the determining comprises determining the user plane security policy to be applied to the UE based on information about the priority in case that at least one of the first configuration information and the second configuration information includes the information about the priority.

3. The method of claim 1, wherein a different user plane security policy is applied, per UE, to the specific service data flow, and wherein the first configuration information received from the UDM takes priority over the second configuration information received from the PCF in determining the user plane security policy.

4. The method of claim 1, wherein a user plane security policy different from another service data flow is applied to the specific service data flow, and wherein a same user plane security policy is commonly applied between UEs to which the specific service data flow is applied, and wherein the determining comprises determining the user plane security policy to be applied to the UE based on information about the priority in case that at least one of the first configuration information and the second configuration information includes the information about the priority.

5. The method of claim 1, wherein a user plane security policy different from another service data flow is applied to the specific service data flow, and wherein the second configuration information received from the PCF takes priority over the first configuration information received from the UDM in determining the user plane security policy.

6. The method of claim 1, further comprising creating and transmitting to a user plane function (UPF) in charge of transferring data in a user plane, by the SMF, a quality-of-service (QOS) enforcement rule (QER) including a packet detection rule (PDR) to be used upon classifying traffic in the UPF and information related to QoS enforcement of traffic identified by the PDR, based on the determined user plane security policy.

7. The method of claim 1, further comprising transferring, by the SMF, a message including security indication information corresponding to the determined user plane security policy and quality-of-service flow identifier (QFI) to a base station linked to the UE through an access and mobility management function (AMF) managing mobility of the UE, wherein the security indication information includes at least one of ciphering information and integrity protection information.

8. The method of claim 7, wherein the security indication information and the QFI are used for creation of a data radio bearer (DRB) for the specific service data flow.

9. A session management function (SMF) configured to manage a protocol data unit (PDU) session for a user equipment (UE) in a wireless communication system, the SMF comprising:
a transceiver; and
a processor configured to:
receive, through the transceiver, a first user plane security policy of the UE and first configuration information about the first user plane security policy of the UE from a unified data management (UDM) configured to manage subscription information about the UE,
receive, through the transceiver, second configuration information about a second user plane security policy to be applied to a specific service data flow from a policy and control function (PCF) configured to manage a policy and charging control (PCC) rule,
select, by the SMF, one of the first configuration information or the second configuration information according to priority based on service data flow identifier (SDF ID) and priority field,
select, by the SMF, one of selected configuration information or security policy applied to the UE according to priority based on the priority field, and
determine a user plane security policy to be applied to the UE based on the selected configuration information or security policy applied to the UE according to priority.

10. The SMF of claim 9, wherein a different user plane security policy is applied, per UE, to the specific service data flow, and
wherein the processor is configured to determine the user plane security policy to be applied to the UE based on information about the priority in case that at least one of the first configuration information and the second configuration information includes the information about the priority.

11. The SMF of claim 9, wherein a different user plane security policy is applied, per UE, to the specific service data flow, and
wherein the first configuration information received from the UDM takes priority over the second configuration information received from the PCF in determining the user plane security policy.

12. The SMF of claim 9, wherein a user plane security policy different from another service data flow is applied to the specific service data flow, and wherein a same user plane security policy is commonly applied between UEs to which the specific service data flow is applied, and
wherein the processor is configured to determine the user plane security policy to be applied to the UE based on information about the priority in case that at least one of the first configuration information and the second configuration information includes the information about the priority.

13. The SMF of claim 9, wherein a user plane security policy different from another service data flow is applied to the specific service data flow, and
wherein the second configuration information received from the PCF takes priority over the first configuration information received from the UDM in determining the user plane security policy.

14. The SMF of claim 9, wherein the processor is further configured to create and transmit to a user plane function (UPF), in charge of transferring data in a user plane, a quality-of-service (QOS) enforcement rule (QER) including a packet detection rule (PDR) to be used upon classifying traffic in the UPF and information related to QoS enforcement of traffic identified by the PDR, based on the determined user plane security policy.

15. The SMF of claim 9, wherein the processor is further configured to transfer a message including security indication information corresponding to the determined user plane security policy and quality-of-service flow identifier (QFI) to a base station linked to the UE through an access and mobility management function (AMF) managing mobility of the UE,
wherein the security indication information includes at least one of ciphering information and integrity protection information.

16. The SMF of claim 15, wherein the security indication information and the QFI are used for creation of a data radio bearer (DRB) for the specific service data flow.

* * * * *